United States Patent [19]

Ohsol et al.

[11] Patent Number: 5,593,591

[45] Date of Patent: Jan. 14, 1997

[54] PRODUCTION OF DRY, FREE FLOWING SOLIDS FROM BIO-WASTE SLUDGE

[75] Inventors: Ernest O. Ohsol, Crosby; Thomas G. Callery, Houston, both of Tex.

[73] Assignee: Unipure Corporation, Houston, Tex.

[21] Appl. No.: 475,811

[22] Filed: Jun. 7, 1995

[51] Int. Cl.$^6$ .................................................. C02F 1/54
[52] U.S. Cl. ..................... 210/609; 210/631; 210/710; 210/734; 210/737; 210/759; 210/916; 210/774
[58] Field of Search .................................. 210/609, 631, 210/698, 734, 737, 759, 764, 774, 916, 700, 710

[56] References Cited

U.S. PATENT DOCUMENTS

| | | |
|---|---|---|
| 3,804,755 | 4/1974 | Cervantes . |
| 4,261,836 | 4/1981 | Koglin ........................... 210/737 |
| 4,479,879 | 10/1984 | Hashimoto et al. ............ 210/734 |
| 4,541,986 | 9/1985 | Schwab et al. ................. 210/916 |
| 4,673,510 | 6/1987 | Janusch et al. ................. 210/737 |
| 4,913,585 | 4/1990 | Thompson et al. ............. 210/734 |
| 4,938,876 | 7/1990 | Ohsol .............................. 210/708 |
| 4,956,092 | 9/1990 | Blum .............................. 210/609 |
| 4,988,442 | 1/1991 | Highsmith et al. ............. 210/774 |
| 5,188,740 | 2/1993 | Khan .............................. 210/609 |
| 5,188,741 | 2/1993 | Zang et al. ..................... 210/774 |
| 5,200,085 | 4/1993 | Rudolf et al. .................. 210/703 |
| 5,354,458 | 10/1994 | Wang et al. ................... 210/205 |

FOREIGN PATENT DOCUMENTS 0536963  4/1993  European Pat. Off. ............ 210/737

Primary Examiner—Neil McCarthy
Assistant Examiner—Theodore M. Green
Attorney, Agent, or Firm—Jenkens & Gilchrist

[57] ABSTRACT

Dry, free flowing solids, suitable for handling, transportation and/or disposal are produced from messy biologically treated sludges. In the process, the sludge feed is pressurized and heated, then flashed, in order to vaporize a portion of the water; the residual liquid, containing the solids and sometimes heavy metals, is contacted with a chelating agent, if needed, and a flocculating agent over a brief reaction period in order to precipitate a concentrated solid precipitate; and the precipitate is separated from the residual liquid water.

6 Claims, 1 Drawing Sheet

PRODUCTION OF DRY, FREE FLOWING SOLIDS FROM BIO-WASTE SLUDGE

BACKGROUND OF THE INVENTION

The invention relates to the production of materials suitable for disposal from of aqueous suspensions of solids, liquids and usually gases (also known as "sludges"), and in particular to the production of disposable solids from sludges produced in municipal and/or industrial waste treatment plants which treat such waste with biological agents.

Municipal and industrial waste treatment plants produce large volumes of sludges containing solids, entrained gases and residual water. Typically, such sludges contain 99 weight percent water or more. Some portions of the sludge are heavier than water and tend to sink; other portions (often containing entrained gases) tend to float; and any water separating out of the overall sludge usually contains high concentrations of solids. These sludges are costly to transport and to properly dispose, due in large measure to the high concentration of water. Various methods have been proposed to remove some of this water and produce a higher solids content concentrate, however, the methods proposed to date have been costly (e.g., evaporation of the water) and/or relatively ineffective (e.g., filtration) in achieving significant reductions in the water content. For example, filtration and/or pressing of the sludge commonly produces a semi-solid, messy filter cake which still contains more than 90 weight percent water. Disposal of sludges, and even the somewhat more concentrated material (i.e., from the evaporation, filtration and/or pressing methods) in landfills usually results in additional problems, e.g., the release of malodorous vapors and the gradual seepage of this water out of the disposal pile over a long period of time, contaminating ground water if not properly contained and treated. Part of the problem appears to result from the tendency of biologically treated materials to contain surface active agents, and the biological agents themselves, which tend to releasably bind water to the solids, thus rendering pre-disposal separation of the water more difficult. Prior methods also produce relatively poor quality water from the separation process, in that the solids content of such water tends to be unacceptably high.

Accordingly, there is a need for an improved method for producing disposable materials from biologically treated sludges, which method economically and effectively reduces the water content of the separated solids, and provides a cleaner separated water, in order to mitigate the above described problems.

SUMMARY OF THE INVENTION

This invention provides a process for producing dry, free flowing solids from biologically treated sludges. In the process, the sludge is pressurized and heated, then flashed in order to vaporize a portion of the water; the residual liquid, containing the solids, is contacted with a flocculating agent over a brief reaction period in order to precipitate a concentrated solid precipitate, such precipitate is separated from the residual liquid water, yielding dry, free flowing particulate solids having a relatively low water content. If desired, such particulate solids may be dried to further reduce their water content.

In one embodiment of the invention, the sludge feed is stored and transported, and the other steps of the process up to and including the solids/liquid separation step are all conducted under conditions so as to substantially exclude oxygen from the fluids and solids being processed. Optionally, an inert gas blanket is used as needed throughout these process steps until the water is separated from the solids.

In another embodiment, at one of several steps during the process, any toxic or malodorous gases released from the sludge feed are separated and separately treated, such as by burning.

The production of dry, free flowing solids from bio-waste sludges has not heretofore been practical. As compared to prior processes, the invention economically and effectively rejects from the sludge the vast majority of its water and produces a low density, dry, free flowing solid particulate which is easily handled and disposed of without the attendant problems of the messy filter cakes and semi-solid masses produced by prior methods. The process also substantially reduces the volume of the material to be disposed, by rejecting a major portion of the water contained in the sludge feed. Rejection of 90 percent of the water in the feed is easily achieved, while only requiring the energy input to vaporize a small fraction of this amount. Under optimized conditions, the process of this invention has achieved rejection of greater than 97 percent of the water in the feed sludge, while requiring only about 10 to 15 percent of the energy required by prior methods using evaporation to reject water. The solids produced by this process do not release their contained water as readily as compared to the sludge feed, and, in any event, there is less water to be released. Also, during the process, any toxic and/or malodorous gases contained in the sludge feed are separated, and can be separately treated to reduce or eliminate their toxicity and/or nuisance. Further, we have found that the water separated from the sludge feed using the process of this invention has a substantially lower content of residual solids; it often is clear and any remaining solids are easily filtered from the water. Thus, this invention is believed to represent a dramatic improvement over prior processes.

DETAILED DESCRIPTION OF THE INVENTION

Figure 1:
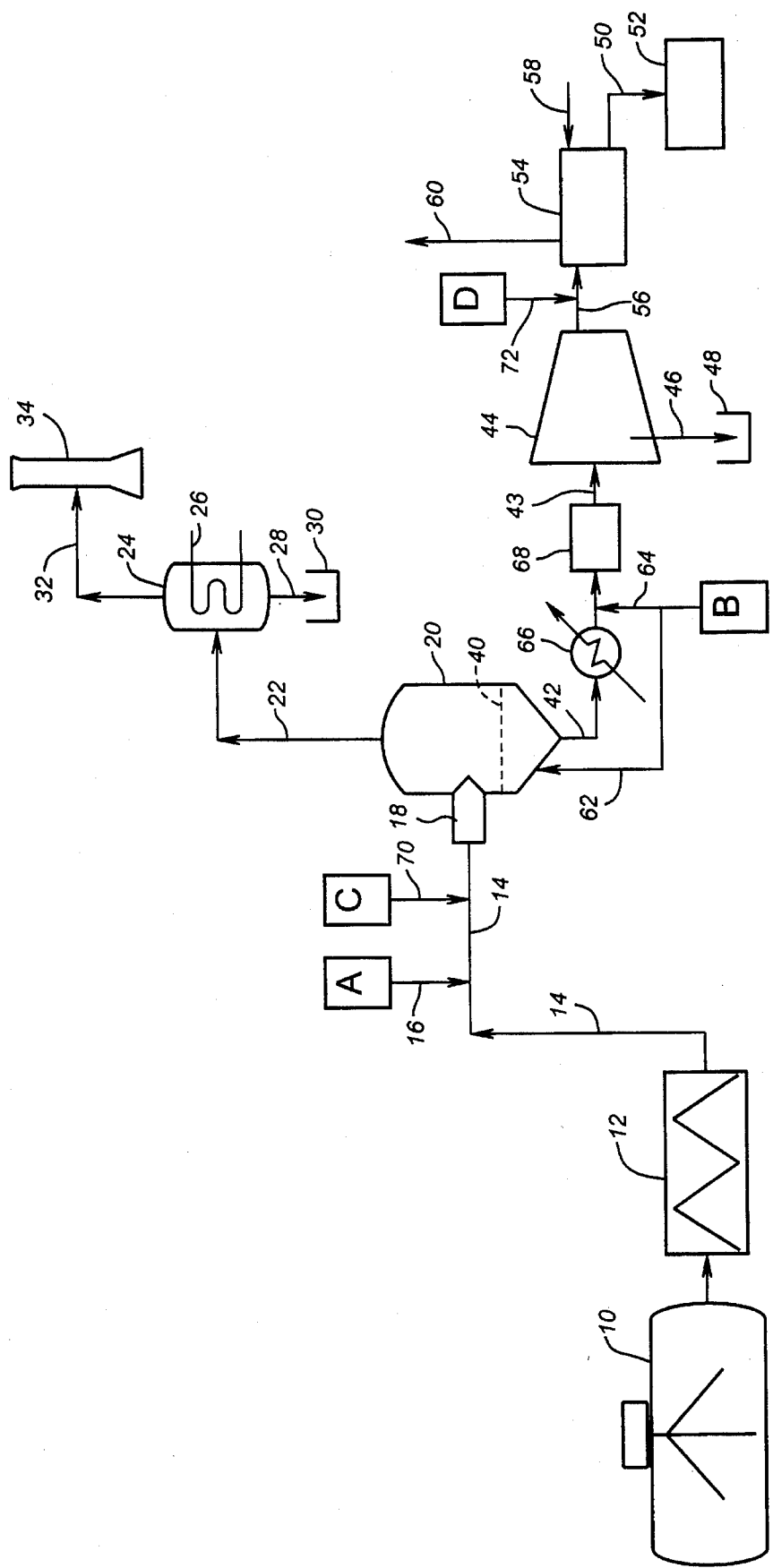
FIG. 1 is a schematic diagram showing one embodiment of the invention.

The sludge feeds which are suitable for the process of this invention include those produced in most municipal and/or industrial waste water treatment plants, particularly those which treat the waste water with bioactive agents. Typically, the sludge is concentrated in an activated sludge thickener to a water content typically from about 98 to about 99.9 weight percent. Such sludges contain water, entrained gases, and inorganic and/or organic solids; however, they are usually relatively free of hydrocarbon oils. For this invention, it is preferred that the sludge feed be substantially free of oil. As used herein, "substantially oil-free" shall mean having a hydrocarbon oil content less than about 0.1 weight percent.

Referring to FIG. 1, sludge feed from an activated sludge thickener 10 is pressurized by means of a sludge pump 12 (such as a Moyno pump) and flowed through a line 14 at a superatmospheric pressure. In line 14, the sludge feed is heated, such as by injection of steam under pressure (from steam source A through line 16 into line 14), to a desired temperature which is at or near the boiling point of water under the superatmospheric conditions in line 14. From line 14, the pressurized and heated sludge feed is flashed, such as through nozzle 18 (which may be a Venturi type nozzle), into a flash vessel 20 so as to vaporize a portion of the water contained in the sludge feed. The vaporized water and any non-condensable gases (which may include certain toxic and/or malodorous gases, such as mercaptans, hydrogen sulfide, amines and/or ammonia) are removed overhead through line 22. While line 22 may be vented to the atmosphere (not shown), it is preferred to discharge the contents of line 22 into a condensor/separator 24, wherein the vapors are cooled, such as by indirect heat exchange with a cooling media flowing through condensor coil 26. Some or all of the water vapor will be condensed and recovered through line 28 to a collection sump 30. While uncondensed vapors from condensor/separator 24 may be vented to the atmosphere (not shown), it is preferred that such vapors be flowed through line 32 to a flare 34 for burning. Depending upon the composition of the vapor, it may be desirable (in lieu of or in addition to burning) to treat such vapors to abate any toxins or malodorous gases prior to burning or release of the residual gas to the atmosphere, such as by scrubbing in a scrubber (not shown).

After passing through nozzle 18, the unflashed fluid (comprising liquid water and the solids) descends to the bottom of flash vessel 20, and in most cases there will be a level of such fluid (shown as line 40) in the bottom of flash vessel 20. The solids and residual liquid water are withdrawn from the bottom of flash vessel 20, such as through transfer conduit 42 and eventually through conduit 43 into a solids/liquid separation device 44 (which may be a disc-type centrifuge). The separated liquid water is removed from separation device 44 through line 46 into a collection sump 48. The separated solids are discharged from separation device 44 through line 56 and eventually through line 50 into a bulk solids receiving container 52. In an optional embodiment shown, the separated solids from separation device 44 are discharged through line 56 into a solids dryer 54 and then through line 50 to bulk solids receiving container 52; and a heated gas (such as air or nitrogen) is flowed countercurrently to such solids from line 58, through dryer 54, exiting through line 60. In the event that the gases exiting from the dryer contain any malodorous or toxic vapors, they may be routed to flare 34 for burning. Dryer 54 can be any type of suitable solids dryer, such as a continuous tray dryer or inclined rotating bed dryer.

In one embodiment of the invention, a deodorizing agent is beneficially added to the solids in line 56 exiting from separation device 44, such as from tank D through line 72 into line 56. Suitable deodorizing agents include hydrogen peroxide or other oxidants, which would oxidize any residual malodorous gases which might otherwise evolve from the solids in dryer 54 or collection container 52. Preferably, a concentrated aqueous solution of hydrogen peroxide (such as a solution contain from about 5 to about 30 weight percent of hydrogen peroxide) is added to the solids in line 56 at a rate equivalent to about 1 to 5 weight percent of the solids. The amount and concentration of the oxidant is selected so as to achieve the desired oxidation, while not unduly adding water to the solids.

At some point downstream of the flashing (i.e., downstream of nozzle 18), a flocculant is injected into the unflashed fluid. Where the flocculant is temperature sensitive (as are the preferred polyacrylamide flocculants), it is preferred to introduce the flocculant at a point downstream of flash vessel 20 where the unvaporized fluid has a lower temperature than the flash temperature. In the preferred embodiment shown in FIG. 1, a cooler 66 is positioned in line 42 downstream of flash vessel 20 and upstream of separation device 44; and a mixing device 68 (which may be a static in-line mixer) is positioned in line 43 between cooler 66 and separation device 44. When a temperature sensitive flocculant is used, the preferred addition point is between cooler 66 and mixer 68, such as from tank B through line 64. Where the flocculant is less temperature sensitive, or where there is not sufficient residence time in the system (i.e., lines 42 and 43, and mixer 68) downstream of flash vessel 20, some or all of the flocculant may be added from tank B through line 62 directly into the bottom of flash vessel 20, or any intermediate point.

We have found that the above described process is usually sufficient to produce an excellent separation between the solids and liquids in the feed sludge, and a high rejection of water from the treated sludge feed, and an acceptably low content of water in the precipitated solids, and precipitated solids which are dry and free flowing, without the need for additional additives or treatments. However, it is contemplated that for some sludge feeds, it may be desirable to add certain surfactants or other additives to pretreat the sludge feed prior to flashing. For example, the addition of a surfactant, such as those water-based demulsifier type of surfactants marketed by Betz Chemical Company under the trademarks "BETZ 901" or "BETZ 905" (such as from tank C through line 70 into the feed sludge in line 14) may beneficially aid in the production of water (through line 46 into sump 48) which has a lower solids content and/or higher clarity.

Although not wishing to be limited to any particular theory of operation, it is believed that the pressurizing and heating, followed by rapid flashing, in the process of this invention facilitates the break up of biologically promoted, cage-like structures which seem to releasably bind water to the solids, and the addition of the flocculant soon after the flashing promotes the rapid precipitation and separation of the concentrated solids from the residual liquid water. Such cage-like structures seem to be resistant to filtration, pressing or other methods relying on external pressure to force the bound water out of the solids. Filter cakes from conventional filtration or pressure concentration methods typically still have a water content greater than 90 weight percent. However, the internally generated pressure of the present invention, caused by the vaporization of a small fraction of the contained water, seems to break down these structures. In any event, the process has proven to be far more effective than previously known methods in rejecting water and producing a disposable product. Specifically, while vaporizing typically between about 3 and about 20 percent of the water in the sludge feed, our process effectively rejects in excess of 90 percent (preferrably between about 96 and about 99.8 percent, more preferably between about 98 and about 99.5 percent) of the total water in the feed. Under optimum conditions, our process uses no more than 10 to 15 percent of the energy which would be required to achieve the same amount of water rejection by the prior evaporative methods, and achieves a result which is believed to be unachievable with prior filtration and/or pressing methods. Even without the optional step of drying in dryer 54, the particulate solids from the process of this invention typically contain from 20 to 50 weight percent solids (equivalent to the rejection of from 96 percent to more than 99 percent of the water in a typical sludge feed containing 0.5 to 1.0 weight percent solids). Such solids are dry, free flowing particulates which are easily handled and disposed. With the optional step of drying the particulate solids from separation device 44, solids with water contents of from 40 to 60 weight percent are achievable (equivalent to the rejection of from about 98.5 percent to about 99.7 percent of the water in a typical sludge feed containing 0.5 to 1.0 weight percent solids).

One operating parameter of our process is the residence time for interaction of the flocculant with the unvaporized fluid from the point of flocculant introduction until separation of the precipitated solids from the residual liquid. Relatively short residence times are usually sufficient, such as 10 minutes or less. Often a residence time between about 3 seconds and about 2 minutes is sufficient; a residence time between about 10 and about 25 seconds is particularly preferred. This residence time can be achieved by controlling the point of flocculant addition, the holding time in any intermediate lines or vessels, and the flow rate of the unvaporized fluid from the point of addition to the separation device. Referring to FIG. 1, where the flocculant is injected from tank B through line 64 (as preferred) the necessary residence time is achieved in line 42 downstream of the addition point and in the mixing device 68. Where a longer residence time in desired, some or all of the flocculant may be added through line 62 into the body of fluid in the bottom of flash vessel 20. It is contemplated that separate portions of the flocculant (or, although not shown, separate portions of different flocculating agents) might be added through lines 62 and 64, respectively.

It is desired that the added flocculant mix with the unvaporized fluid sufficiently to effect the desired precipitation and separation of the solids. This mixing may naturally occur as the components to be mixed flow through flash vessel 20 and/or conduit 42, or a separate mixing device (such as mixer 68) may be installed anywhere in the line between flash vessel 20 and separation device 44. Preferably, mixer 68 device is downstream of cooler 66 and the point of flocculant addition.

Biologically treated sludge feeds often are malodorous and/or contain toxic gases. Also, they often are somewhat reactive with oxygen, which reactions may complicate the separation of the solids and/or lead to the evolution of malodorous and/or toxic gases. It has been found that it is beneficial to exclude oxygen from contact with the sludge feed and/or with the various fluids and solids during their processing in this invention prior to the actual separation of the particulate solids from the residual liquid. Accordingly, it is preferred that the steps of the invention up to and including the solids/liquid separation step be conducted under substantially oxygen-free conditions. By "substantially oxygen-free conditions" it is meant that the concentration of oxygen is significantly less than in air, and preferably is less than about 3 volume percent. Preferably, the sludge feed storage tank (such as activated sludge thickener 10) and separator 44, are equipped with a blanket of inert gas (such as nitrogen) in order to minimize the contact with air or other oxygen sources prior to the discharge of the solids from separator 44.

The temperatures and pressures of the various process steps should be selected to flash enough water from the sludge feed in order to ensure break down of any biologically promoted structures binding water into the sludge. A balance is normally made between the amount of water rejection required to produce the dry, free flowing solids product, and the expense of the heat and pressure required to achieve that amount of water rejection. Normally, at least about 3 percent of the water in the heated sludge feed should be flashed to vapor in flash vessel 20. Flashing from about 3 to about 20 percent of the water in the heated sludge feed is usually sufficient to achieve these objectives, more preferably from about 5 to about 15 percent, and most preferably from about 8 to about 12 percent. The sludge feed to be treated by the process will normally be pressurized in line 14 to a pressure above 60 psig, preferably from 75 to 150 psig, and more preferably from 80 to 110 psig. The pressurized sludge feed in line 14 is to be heated to a temperature at or near the boiling point of water at the pressure in line 14. Preferably the sludge feed is heated to at least 250° F., more preferably between about 260° F. and about 360° F., and most preferably between about 280° F. and about 330° F. The pressurized and heated sludge feed will be flashed through nozzle 18 to a pressure at or near atmospheric pressure, typically between about 0 and about 20 psig at the outlet of flash vessel 20, more preferably between about 5 and about 10 psig at the outlet of the flash vessel 20.

Prior to the addition of a temperature sensitive flocculant, such as the preferred polyacrylamide flocculants, it is preferred that the unvaporized fluid stream from flash vessel 20 be cooled (such as in cooler 66) to a temperature at which decomposition of the flocculant will be insignificant or at least minimized. It is preferred that this stream be cooled to a temperature between about 120° F. and about 180° F., more preferably between about 140° F. and about 170° F. The temperature in separation device 44 is beneficially maintained above about 90° F., more preferably between about 110° F. and about 170° F.

If desired, drying of the precipitated solids from separator 44 in dryer 54 may be conducted so as to reduce the final water content of the solids discharged through 50 to an even lower water content. Unlike evaporation of water from the sludge feed pursuant to the prior evaporative methods, this drying step is significantly less energy intensive, also the handling of the solid material in the dryer is substantially enhanced by the fact that it is already dry and free flowing. The majority of the water to be separated has already been removed, and the residual, unbound water clinging to the particulate solids is relatively easily evaporated. The temperature of the gas flowed through line 58 into dryer 54 is preferably between about 200° F. and about 400° F. Drying time in dryer 54 will vary; however, between about 2 and about 10 minutes is preferred.

A variety of known flocculants may be used in the process of this invention. Inorganic flocculants, such as alum, sodium carbonate, sodium silicate or the like may be used. Organic flocculants, such as polyacrylamide polymers, partially hydrolyzed polyacrylamide polymers, or partially hydrolyzed polyacrylamide polymers, hydroxycellulose polymers, quaternized polyacrylamide polymers, and the like may also be used.

As used herein, the term "polyacrylamide flocculant" is intended to broadly include not only (a) flocculants which are homopolymers of acrylamide, but also (b) copolymers of acrylamide with other monomers, such as sodium acrylate where an anionic flocculant is desired, or an amine- or quaternized-amine containing monomer, where a cationic flocculant is desired, and (c) combinations of such homopolymers and copolymers of acrylamide, and (d) chemically altered derivatives of such homopolymers and/or copolymers. If the suspended particles in a sludge feed tend to be cationic, an anionic flocculant will normally be the most effective, and vice versa. Nonionic polyacrylamide flocculants are also suitable in various cases. The degree of hydrolysis of a polyacrylamide flocculant is another variable, with such degree affecting the charge density of the flocculant.

The polyacrylamide flocculants which can be used in this invention include the commercially available, water-soluble, medium to high molecular weight, unhydrolyzed or partially hydrolyzed polyacrylamides having molecular weights above about 250,000, preferably in the range of from about 250,000 to about 5,000,000, more preferably in the range of from about 300,000 to about 2,000,000, and most preferably from about 500,000 and about 1,000,000. The preferred partially hydrolyzed polyacrylamides have up to about 15 percent of the carboxyamide groups originally present in the polyacrylamide hydrolyzed to carboxyl groups. Preferably between about 1 and about 10 percent of the carboxyamide groups are so hydrolyzed, more preferably between about 2 and about 6 percent. The products resulting from the hydrolysis of polyacrylamide consist of a long hydrocarbon chain, the alternate carbon groups of which bear either amide or carboxylic groups. Similar product may also be produced by copolymerization of acrylic acid and acrylamide. Both routes of manufacture are well known. The term "hydrolyzed polyacrylamide flocculant" as used herein is inclusive of modified polymers wherein the carboxyl groups of the polymer are in the acid form and also of such polymers wherein the carboxyl groups are in a water-soluble salt form. Suitable polyacrylamide and partially hydrolyzed polyacrylamide flocculants are commercially available from various companies. One such flocculant is marketed by Betz Chemical Company under the trademark "Betz NOVUS." Of particular advantage are water soluble graft copolymars such as these described in U.S. Pat. No. 5,108,622 which is incorporated herein by reference for all purposes.

It has been found that the polyacrylamide flocculants work especially well when added either (a) in the concentrated, (or "neat"), form as received from the manufacturer, which normally contains between about 90 and about 95 weight percent of the polymer, or (b) in a diluted solution, such as a solution containing between about 0.2 and about 4 weight percent, more preferably between about 0.5 and about 2.0 weight percent of the polymer. In some tests, we found that concentrations intermediate these two extremes were not as effective and may result in curd-like masses being formed which are not easily separated.

The amount of the flocculant needed to facilitate the desired precipitation and concentration of the solids will vary with the flocculant selected and the operating conditions, and also with the particular characteristics of the sludge feed. With the preferred polyacrylamide flocculants, sufficient flocculant is preferably added to provide a concentration in the unvaporized fluid between about 500 wppm and about 5,000 wppm, more preferably between about 800 and about 3,000 wppm.

In the event the biowaste sludge is additionally contaminated with heavy metal such as vanadium chromium, copper and the like, it may be removed by the addition of an appropriate complexing agent prior to the flocculation of the solids since the complexing agent draws the heavy metal into the water phase which separates from the solid upon flocculation. There is considerable skill within the art concerning the use of complexing agents, particularly the polycarboxylic acids and or polyaminocarboxylic acids, such as nitrilotriacetic acid and its sodium salt or ethylenediaminetetraacetic acid and its sodium salts as described in U.S. Pat. Nos. 3,838,102 and 3,951,917, for example. It is common to use these materials in combination with quaternary ammonium salts such as described in U.S. Pat. Nos. 4,026,870 for example and other complex forming compounds, the entire disclosures of the above-identified patents being hereby incorporated by reference and relied upon for all purposes. Other chelating agents which may find value in the practice of this invention are citric acid, glycolic acid, phosphoric acid derivatives, phnalodinitrile, phnalimide and the like.

The complex forming agent is preferably added to the mixture, preferably after flashing in an amount of from about 0.5 to about 5 moles per mole of metal ion present, or said another way in a concentration of from about 30 to about 10,000 parts per million. Most preferred in the practice of this invention would be add the chelating or complexing agent to the mixture prior to flocculation in an amount of 50 to 5000 parts per million by weight. One skilled in the art may determine through simple experimentation that more or less of the complexing agent may be used to good advantage in the practice of this invention.

The invention is further described by the following examples which are illustrative of specific modes of practicing the invention and is not intended as limiting the scope of the invention as defined by the appended claims.

EXAMPLE 1

An aqueous sludge feed from an industrial waste biological treatment plant at an oil refinery is a suspension of solids in water, with about 99 weight percent water, about 1.0 weight percent solids (including both organic and inorganic materials), entrained non-condensable gases including hydrogen sulfide, and essentially no hydrocarbon oil. This sludge feed is pressurized to 100 psig and then heated to 325° F. by injection of steam. The pressurized and heated fluid is then flash through a Venturi nozzle into a flash vessel maintained at a vapor outlet pressure of 5 psig. About 8 percent (by weight) of the water in the sludge feed is vaporized due to the flashing, with the vapor comprising this vaporized water and the non-condensable gases. The vapor is removed from the flash vessel and cooled to condense a major portion of the water vapor; the residual vapor is routed for burning in the refinery's flare system. The unvaporized fluid from the flash vessel is cooled by indirect heat exchange to a temperature of about 150° F., and then a concentrated solution of an anionic polyacrylamide flocculant (containing about 85 weight percent of the polymer) is added to the unvaporized fluid at a rate sufficient to provide a polymer concentration in the unvaporized fluid of about 1,000 wppm. The active ingredient of the flocculant is a sodium salt of a partially hydrolyzed copolymer of polyacrylamide and sodium acrylate with an average molecular weight of about 1,000,000 and having about 10 percent of the carboxyamide groups originally present in the copolymer hydrolyzed to carboxyl groups. The flocculant and unvaporized fluid are passed through a static mixer and then processed by a disc-type centrifuge to separate the water from the particulate product formed from the flocculant and the solids formerly suspended in the sludge feed. The mean residence time of the unvaporized fluid and flocculant, between the point of flocculant addition and their entry into the centrifuge, is about 30 seconds. The centrifugate has a solids content of 40 weight percent, and they are dry, free flowing, low density (a specific gravity of about 1.1) solid particulates. The water recovered (i.e., from vaporization in the flash vessel and/or by separation from the centrifuge) is equal to 98.5 percent of the water in the sludge feed.

EXAMPLES 2–5

An aqueous sludge from a biological treatment plant in a refinery contains about 0.41 weight percent solids, and essentially no oil. This sludge feed was subjected to treatment in process equipment adapted for the process of this invention, including the pressurization and heating of the sludge feed, then flashing of the pressurized and heated fluid, condensation and collection of the resulting vapor, addition of a polyacrylamide flocculant to the unvaporized fluid, and separation of the water from the solids in the unvaporized fluid. Four test runs were conducted, in runs A1 and A2, the steps of pressurizing and heating, then flashing were omitted, whereas in runs B1 and B2, all steps are included. For runs B1 and B2, the sludge feed was pressurized to a pressure of 80 psig, and was heated by steam injection to a temperature of about 280° F.; the flash vessel was maintained such that the vapor outlet pressure was about 6 psig; about 6 percent of the water in the sludge feed was flashed to vapor; the unvaporized fluid was cooled to about 225° F.; then a 85 weight percent solution of a polyacrylamide flocculant (marketed by The Betz Chemical Company under the trademark "Betz NOVUS") was added to achieve a concentration in the unvaporized fluid of about 3,000 wppm; and the residence time between the flocculant addition and the separation of the solids from the liquid was about 25 seconds. For runs A1 and A2 in which no flash was used, the sludge was maintained at about 120° F. for the flocculant addition and separation steps. The collected solids from each run are analyzed to determine their solids contents, with the following results:

| Test Run | Product Solids Content (wt. %) |
|----------|-------------------------------|
| A1       | 17.5                          |
| A2       | 17.9                          |
| B1       | 31.0                          |
| B2       | 29.9                          |

The solids from runs A1 and A2 are still difficult to handle, being messy and yielding water upon squeezing. On the other hand, the solids from runs B1 and B2 were dry, free flowing, particulate solids with a sponge-like appearance and density, that were easily handled for disposal.

It was readily apparent from this disclosure that the method of this invention is versatile and can be utilized to concentrated solids from a wide variety of biologically treated sludges by proper selection of the operating conditions, flocculant(s), and process equipment. While particular embodiments of the invention have been described, it will be understood, of course, that the invention is not limited thereto since many obvious modifications can be made, and it is intended to include within this invention any such modification as will fall within the scope of the appended claims.

EXAMPLE 6

In an operation reproducing test run B-2 of Example 5, the initial sludge was found to contain 220 ppm of contained lead. A stream of 5 percent monosodium EDTA dissolved in water is injected into the pressurized, preheated sludge stream upstream of the flash nozzle. The amount of EDTA is calculated to be 600 ppm based on the initial sludge. The EDTA remained in contact with the sludge stream for a total of 15 minutes. After centrifugation, the recovered bio-solids are found to contain only 5 ppm of lead. The balance of the lead is in the recovered water and is removed as lead sulfide precipitate, using a small injection of hydrogen sulfide.

We claim:

1. A process for the production of dry, free flowing, particulate solids suitable for convenient handling, transporation and/or disposal from an aqueous, substantially oil-free, biologically treated sludge feed containing a suspension of solids in water, comprising:
    (a) pressurizing said sludge feed to a pressure between about 80 and 110 psig; and
    (b) injecting pressurized steam into the pressurized sludge feed so as to raise the temperature of said sludge feed to between about 280° F. and about 360° F.; and
    (c) flashing said sludge feed into a flash vessel maintained at a pressure between about 5 and about 10 psig, in order to induce the vaporization of between about 5 and about 15 percent of the water contained in said sludge feed, thereby forming a vapor containing a first, vaporized portion of said water, and an unvaporized fluid stream comprising a second, unvaporized portion of said water and said solids; and
    (d) separating said vapor from said unvaporized fluid stream; and
    (e) cooling said unvaporized fluid stream downstream of said flash vessel to a temperature between about 120° F. and about 180° F.; and
    (f) adding a polyacrylamide flocculant into the cooled unvaporized fluid stream, such addition being in an amount sufficient to provide a concentration of one or more partially hydrolyzed polyacrylamide polymers in said fluid stream between about 800 and about 3,000 wppm, and wherein said polymer(s) has (have) an average molecular weight of between about 500,000 and about 1,000,000, and has (have) between about 1 and about 10 percent of the carboxyamide groups originally present in said polymer(s) hydrolyzed to carboxyl groups; and
    (g) contacting said flocculant with said unvaporized fluid stream during a reaction period so as to form a precipitate containing said flocculant and substantially all of said solids; and
    (h) separating said precipitate from the remainder of said fluid stream, so as to produce (1) said dry, free flowing particulate solids having a water content less than about 30 weight percent, and (2) liquid water which together with said first, vaporized portion of water comprises at least about 98 percent of the total water from said sludge feed.

2. The process of claim 1 wherein said flocculant is added by injection of a dilute aqueous solution containing between about 0.5 and about 2.0 weight percent of said partially hydrolyzed polyacrylamide polymer.

3. The process of claim 1 wherein said flocculant is added by injection of a concentrated aqueous solution containing between about 95 and about 98 weight percent of said partially hydrolyzed polyacrylamide polymer.

4. The process of claim 1 further comprising the step of adding a deodorizing agent to the separated precipitate from step (h).

5. The process of claim 4 wherein said deodorizing agent is an aqueous solution of hydrogen peroxide.

6. The process of claim 5 wherein said aqueous solution has a concentration of hydrogen peroxide between about 5 and about 30 weight percent, and said deodorizing agent is added at a rate equal to between about 1 and about 5 weight percent of said separated precipitate.

* * * * *